US011992909B2

(12) United States Patent
Matsuo et al.

(10) Patent No.: US 11,992,909 B2
(45) Date of Patent: May 28, 2024

(54) ATTACHMENT FOR MACHINING APPARATUS

(71) Applicant: SUBARU CORPORATION, Tokyo (JP)

(72) Inventors: Shinya Matsuo, Tokyo (JP); Tatsuo Nakahata, Tokyo (JP); Masao Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 822 days.

(21) Appl. No.: 16/708,761

(22) Filed: Dec. 10, 2019

(65) Prior Publication Data

US 2020/0108481 A1     Apr. 9, 2020

Related U.S. Application Data

(63) Continuation of application No. PCT/JP2018/016953, filed on Apr. 26, 2018.

(30) Foreign Application Priority Data

Jun. 22, 2017   (JP) ................................ 2017-122495

(51) Int. Cl.
*B23Q 11/00* (2006.01)
*B23Q 35/10* (2006.01)

(52) U.S. Cl.
CPC .......... *B23Q 11/0046* (2013.01); *B23Q 35/10* (2013.01)

(58) Field of Classification Search
CPC .................................... B23C 1/18; B23C 1/16
See application file for complete search history.

(56) References Cited

U.S. PATENT DOCUMENTS

| 3,739,679 A | 6/1973 | Schwend |
| 4,909,108 A | 3/1990 | Nakada et al. |
| 5,165,829 A * | 11/1992 | Ross ................... B25J 15/0019 901/41 |
| 5,333,974 A | 8/1994 | Matsuura |
| 5,394,513 A | 2/1995 | Sgarbi et al. |

(Continued)

FOREIGN PATENT DOCUMENTS

| CA | 3066343 | 11/2019 |
| CN | 2404648 Y | 11/2000 |

(Continued)

OTHER PUBLICATIONS

Non Final Office Action dated May 10, 2021 for U.S. Appl. No. 16/471,633 (53 Pages).

(Continued)

*Primary Examiner* — Tanzim Imam
(74) *Attorney, Agent, or Firm* — Smith, Gambrell & Russell, LLP

(57) ABSTRACT

According to one implementation, an attachment for a machining apparatus includes: a copying guide in a machining apparatus side and an air supply passage. The copying guide has a through hole for passing a tool through. The copying guide is contacted to a copying mold placed in a workpiece side. The copying guide is attached to a spindle holding and rotating the tool. The air supply passage is adapted to supply air ejected toward the workpiece side through a clearance between the tool and the through hole.

25 Claims, 8 Drawing Sheets

(56) References Cited

U.S. PATENT DOCUMENTS

| | | | |
|---|---|---|---|
| 8,806,999 | B2 | 8/2014 | Tanaka |
| 9,339,906 | B2 | 5/2016 | Kobayashi |
| 9,539,686 | B2 | 1/2017 | Tanaka |
| 9,724,801 | B2 | 8/2017 | Gu |
| 2004/0058636 | A1 | 3/2004 | Hinsch et al. |
| 2007/0237595 | A1* | 10/2007 | Steger ................ A61C 13/0009 409/86 |
| 2010/0106285 | A1 | 4/2010 | Massey |
| 2010/0185315 | A1 | 7/2010 | Schmidt et al. |
| 2011/0170973 | A1 | 7/2011 | Von Puttkamer et al. |
| 2012/0141218 | A1* | 6/2012 | Saito ...................... B23B 49/02 408/110 |
| 2012/0220194 | A1 | 8/2012 | Maloney et al. |
| 2013/0312991 | A1 | 11/2013 | Hideta et al. |
| 2014/0027139 | A1* | 1/2014 | Hideta .............. B23Q 11/0046 173/198 |
| 2014/0348603 | A1* | 11/2014 | Miyajima .............. B25J 11/005 408/19 |
| 2016/0303697 | A1 | 10/2016 | Isobe |
| 2016/0318151 | A1 | 11/2016 | Kitahata et al. |
| 2016/0332273 | A1 | 11/2016 | Furuya |
| 2017/0008102 | A1 | 1/2017 | Ishikawa et al. |
| 2018/0104850 | A1 | 4/2018 | Guazzoni |
| 2018/0126507 | A1* | 5/2018 | Rivers ................ B23Q 17/2428 |
| 2020/0086406 | A1 | 3/2020 | Ishikawa et al. |
| 2020/0122336 | A1 | 4/2020 | Matsuo et al. |
| 2021/0291369 | A1 | 9/2021 | Hashimoto et al. |
| 2021/0299867 | A1 | 9/2021 | Kenneally et al. |

FOREIGN PATENT DOCUMENTS

| | | | | |
|---|---|---|---|---|
| CN | 1415458 | A | | 5/2003 |
| CN | 101801617 | A | | 8/2010 |
| CN | 104249195 | A | | 12/2014 |
| CN | 104364049 | A | | 2/2015 |
| CN | 105269690 | A | | 1/2016 |
| EP | 0292971 | A2 | | 11/1988 |
| EP | 2946864 | A1 | | 11/2015 |
| EP | 3563988 | | | 11/2019 |
| FR | 2682905 | B1 | | 4/1993 |
| GB | 1 231 289 | A | | 5/1971 |
| JP | 1974-013677 | A | | 4/1974 |
| JP | 1979-160707 | A | | 12/1979 |
| JP | S59-140121 | U | | 9/1984 |
| JP | S60-025673 | A | | 2/1985 |
| JP | H03-047719 | | | 5/1991 |
| JP | 1993-12058 | U | | 2/1993 |
| JP | 1993-020816 | A | | 3/1993 |
| JP | H05-134737 | A | | 6/1993 |
| JP | H07-132471 | | | 5/1995 |
| JP | H09-155738 | | | 6/1997 |
| JP | H10-011125 | | | 1/1998 |
| JP | 2000-343401 | A | | 12/2000 |
| JP | 2002-018629 | A | | 1/2002 |
| JP | 2002-239824 | A | | 8/2002 |
| JP | 2002-370116 | A | | 12/2002 |
| JP | 2006-142434 | A | | 6/2006 |
| JP | 2006-320991 | A | | 11/2006 |
| JP | 2006320991 | A | * | 11/2006 |
| JP | 2010-253613 | A | | 11/2010 |
| JP | 2011-216050 | A | | 10/2011 |
| JP | 2012-139789 | A | | 7/2012 |
| JP | 2013-043232 | | | 3/2013 |
| JP | 2013-244556 | A | | 12/2013 |
| JP | 2013-244564 | | | 12/2013 |
| JP | 2014-040001 | A | | 3/2014 |
| JP | 2017-019042 | A | | 1/2017 |
| WO | 2016/183390 | A1 | | 11/2016 |
| WO | WO-2016183390 | A1 | * | 11/2016 ............ B23B 49/00 |
| WO | 2018/123251 | | | 7/2018 |
| WO | 2018/235429 | | | 12/2018 |

OTHER PUBLICATIONS

Final Office Action dated Jul. 13, 2021 for U.S. Appl. No. 16/690,245 (16 pages).

International Search Report for PCT/JP2018/016953 dated Jun. 26, 2018 (5 pages with English Translation).

Written Opinion for PCT/JP2018/016953 dated Jun. 26, 2018 (4 pages).

First Japancss Office Action dated Feb. 20, 2020 in JP Patent Application No. 33018-558856 (8 pages inclusive of its Engiigh machine translation).

Notice of Allowance dated Jan. 26, 2022 for U.S. Appl. No. 16/471,633 (6 pages).

Non-Final Office Action dated Jan. 5, 2022 for U.S. Appl. No. 16,690,245 (20 pages).

First Japanese office action dated Dec. 22, 2020 in Patent Application No. 2019-525184 with its machine translation.

Advisory Action, Interview Summary and AFCP Decision dated Oct. 26, 2021 in U.S. Appl. No. 16/690,245 (5 pages).

Extended European search report dated Feb. 12, 2021 in EP Patent Application No. 18 820 149.5 (6 pages).

Japanese Office Action dated Aug. 24, 2021 for Japanese Patent Application No. 2019-525184 (6 pages in Japanese with English Translation).

Final Offifce Action dated Oct. 25, 2021 in U.S. Appl. No. 16/471,633 (23 pages).

International Preliminary Report on Patentability dated Jan. 2, 2020 for International Patent Application No. PCT/JP2018/016953 (5 pages in Japanese with English translation).

Supplemental Partial European Search Report Received in EP Application No. 17887317 dated Dec. 4, 2020 (29 Pages).

Pan, Z., et al. Robotic machining from programming to process control: a complete solution by force control. Industrial Robot. 2008. vol. 35, No. 5, pp. 400-409.

Song, H-C., et al. Precision robotic deburring based on force control for arbitrarily shaped workpiece using CAD model matching. International Journal of Precision Engineering and Manufacturing. 2012. vol 14, No. 1, pp. 85-91.

Alici, G., et al. Robotic drilling under force control: Execution of a task. Proceedings of the IEEE/RSJ/GI International Conference on Intelligent Robots and Systems: Advanced Robotics and the Real World. 1994. vol. 3, pp. 1618-1625.

Slamani, M., et al. Comparison of surface roughness quality obtained by high speed CNC trimming and high speed robotic trimming for CFRP laminate. Robotics and Computer-Integrated Manufacturing, Elsevier Science Publishers BV. 2016. vol. 42, pp. 63-72.

Office Action received in U.S. Appl. No. 16/690,245 dated Jan. 6, 2021 (14 Pages).

Notice of Allowance and Fees Due dated May 17, 2022 in U.S. Appl. No. 16/690,245 (9 pages).

Office Action dated Sep. 12, 2023 in European Patent Application No. 18 820 149.5 (4 pages).

Office Action mailed Jan. 19, 2024 in Korean Patent Application No. 10-2016-0086811 (5 pages Korean; 6 Pages English translation). [Family member of U.S. Appl. No. 15/200,087, which has been published as U.S. Appl. No. 2017/0008102 A1 and which share common applicant/inventor(s).].

* cited by examiner

ATTACHMENT FOR MACHINING APPARATUS

CROSS REFERENCES TO RELATED APPLICATIONS

This is a continuation of Application PCT/JP2018/16953, filed on Apr. 26, 2018.

This application is based upon and claims the benefit of priority from Japanese Patent Application No. 2017-122495 filed on Jun. 22, 2017; the entire contents of which are incorporated herein by reference.

FIELD

Implementations described herein relate generally to an attachment for a machining apparatus, a machining apparatus and a machining method.

BACKGROUND

Conventionally, as a method of an outline trim processing of a workpiece consisting of a composite material and/or a metal, a method of copying by placing jigs, including a copying mold, in the workpiece side while attaching a guide for contacting the copying mold to a machine tool, such as a milling machine or a router processing apparatus, as well as an end mill or a cutting tool called a router bit is known.

Meanwhile, the technique of holding a tool with a robot arm for processing, such as chamfering, deburring, polishing, or grinding, has been proposed (for example, refer to Japanese Patent Application Publication JP2002-370116 A, Japanese Patent Application Publication JP2012-139789 A, Japanese Patent Application Publication JP2014-40001 A, Japanese Patent Application Publication JP2011-216050 A and Japanese Patent Application Publication JP2010-253613 A). In particular, the technique of attaching force sensors to an arm of multi joint robot to detect reaction forces from a workpiece so that processing, such as chamfering, deburring, polishing, or grinding, may be performed applying a constant force to the workpiece has been also proposed.

However, the positioning accuracy by a robot is extraordinarily low compared with the positioning accuracy by a machine tool which can position a tool with a pitch of 0.01 mm to 0.001 mm. This is because rigidity of a robot arm is low compared with that of a spindle of a machine tool, such as a machining center d a milling machine.

Therefore, processing by a robot is restricted to processing, such as chamfering, deburring, polishing, or grinding, which requires low processing accuracy or causes a comparatively small reaction force from a workpiece while cutting processing, such as outline trim processing and pocket processing of a workpiece using end mills, which requires processing accuracy whose tolerance is about ±0.1 mm to ±1.0 mm, depends on a large-scale and expensive machine tool compared with a robot.

When a large scale machine tool, such as a machining center or a milling machine, cannot be prepared in order to trim an outline shape of a workpiece, copying is performed manually by an operator using a hand router with a copying guide. Specifically, a copying mold is attached to a workpiece, and the workpiece is cut manually by an operator with pressing the copying guide of the hand router, holding a router bit, to the copying mold.

In the case of manual processing by an operator, it is necessary to adjust a movement speed of a router bit according to processing conditions, such as a thickness change of a workpiece, a form of a workpiece, and a wear condition of a tool. Therefore, there is a problem that copying of a workpiece cannot be performed without a skillful operator who mastered skills in order to secure the processing quality.

Accordingly, an object of the present invention is to enable it to perform cutting machining, such as outline trim processing, outline rough processing, outline finish processing, groove processing, pocket processing or drilling, of a workpiece, with large reaction forces from the workpiece, using a robot, with high accuracy.

SUMMARY OF THE INVENTION

In general, according to one implementation, an attachment for a machining apparatus includes: a copying guide in a machining apparatus side and an air supply passage. The copying guide has a through hole for passing a tool through. The copying guide is contacted to a copying mold placed in a workpiece side. The copying guide is attached to a spindle holding and rotating the tool. The air supply passage is adapted to supply air ejected toward the workpiece side through a clearance between the tool and the through hole.

Further, according to one implementation, a machining apparatus includes the spindle and the above-mentioned attachment attached to the spindle.

Further, according to one implementation, a machining method includes: attaching the above-mentioned attachment to the spindle of the machining apparatus; placing the copying mold in the workpiece side; and producing a product or a semi-product by outline copying of the workpiece using the tool. The outline copying is performed with contacting the copying guide with the copying mold.

DETAILED DESCRIPTION

An attachment for a machining apparatus, a machining apparatus and a machining method according to implementations of the present invention will be described with reference to the accompanying drawings.

(First Implementation)

(Structure and Function of Machining Apparatus)

Figure 1:
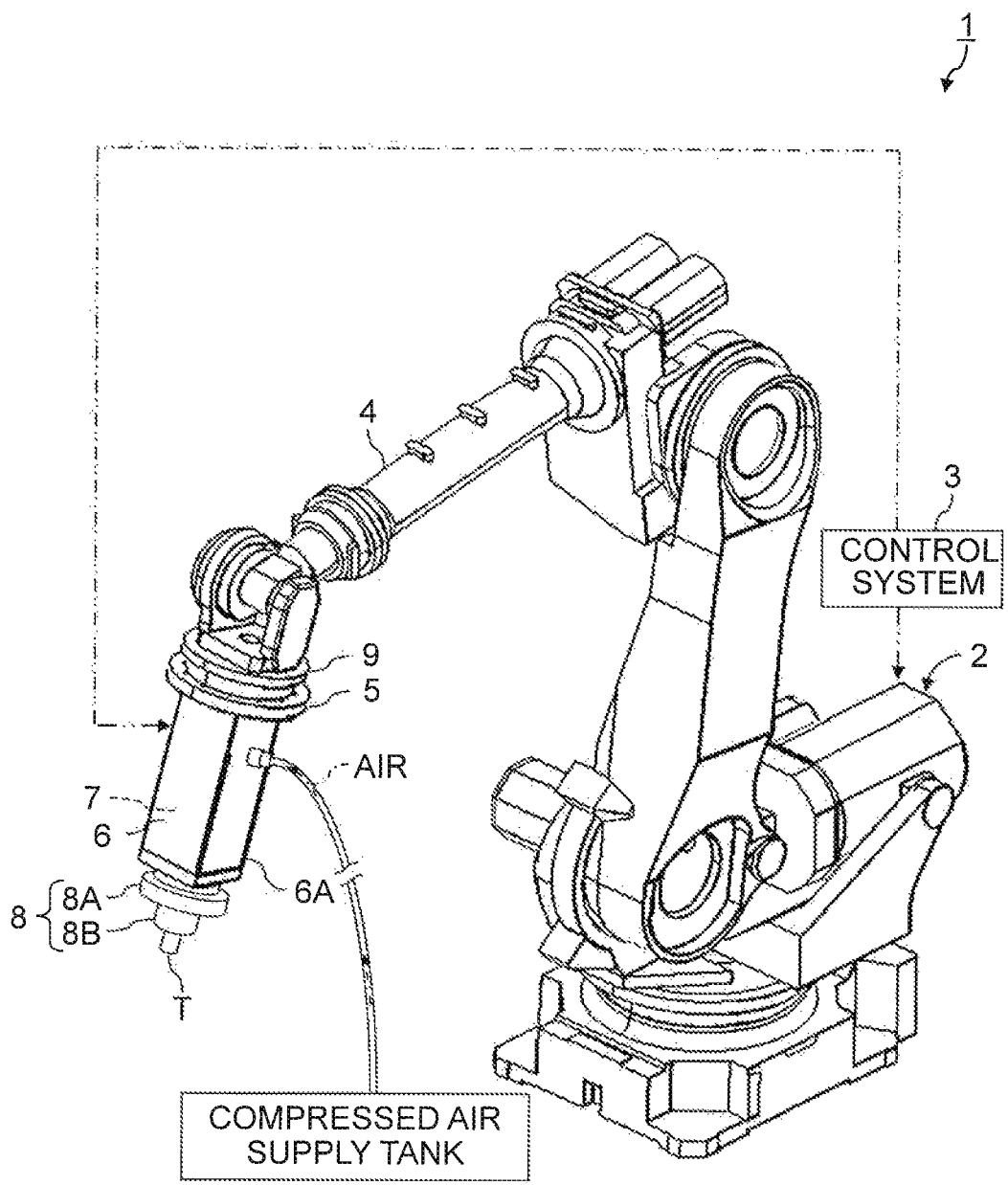
FIG. 1 shows a structure of a machining robot as an example of a machining apparatus according to the first implementation of the present invention.
Figure 2:
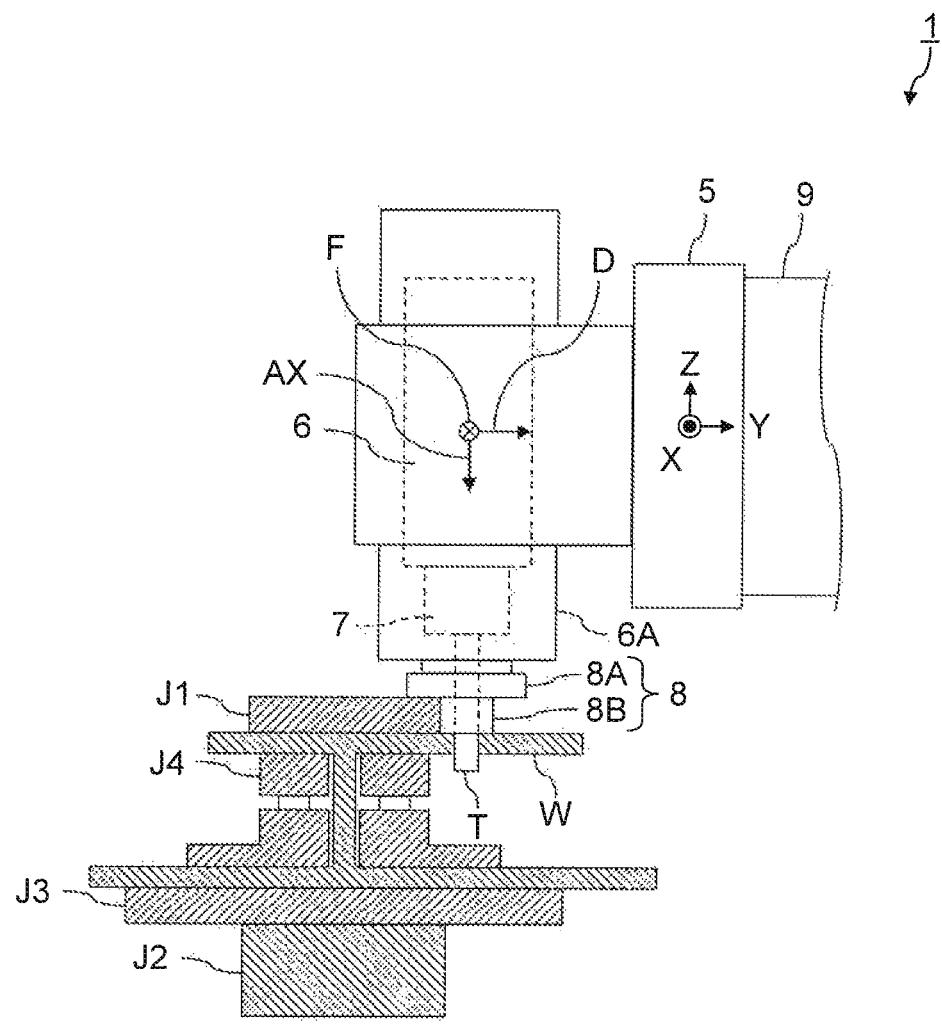
FIG. 2 is a view for explaining a machining method for outline copying of a workpiece to be machined with attaching a tool to the machining robot shown in FIG. 1.

FIG. 1 shows a structure of a machining robot as an example of a machining apparatus according to the first implementation of the present invention, and FIG. 2 is a view for explaining a machining method for outline copying of a workpiece to be machined with attaching a tool to the machining robot shown in FIG. 1.

A machining robot 1 is composed of a robot 2 and a control system 3 of the robot 2. The robot 2 has an arm 4 having a cantilever structure in which links are connected to each other with a plurality of joints. An attachment jig 5 is fixed to the tip of the arm 4. A feed structure 6, a spindle 7, a copying guide 8, and a tool T are attached to the attachment jig 5.

The arm 4 has a structure possible to move the feed structure 6, the spindle 7, the copying guide 8 and the tool T, which are attached to the attachment jig 5, at least two dimensionally. When three links connected to each other with two joints of which rotary shafts are parallel are disposed on a plane in order to configure the arm 4, for example, the feed structure 6, the spindle 7, the copying guide 8, and the tool T which are attached to the attachment jig 5 can be moved in two-dimensional directions on the plane where the three links are disposed.

The typical robot 2 has the arm 4 possible to move the feed structure 6, the spindle 7, the copying guide 8, and the tool T, which are attached to the attachment jig 5, in three-dimensional directions as exemplified in FIG. 1. In an example shown in FIG. 1, the arm 4 has a structure in which links are coupled to each other with a plurality of rotating mechanisms. Therefore, the feed structure 6, the spindle 7, the copying guide 8, and the tool T which are attached to the attachment jig 5 can be not only moved in parallel three dimensionally but also inclined towards a desired direction by rotation movement.

The feed structure 6 gives a feed to the tool T in the tool axis AX direction. The spindle 7, which is a rotating mechanism, holds and rotates the tool T, and can be composed of a holder of the tool T and a motor which rotates the holder. Therefore, the feed structure 6 is configured so that a feeding operation in the tool axis AX direction may be indirectly given to the tool T by giving a feed in the tool axis AX direction to the spindle 7 which holds and rotates the tool T. Each of the feed structure 6 and the spindle 7 may be a generalized pneumatic type, hydraulic type, electric type, or another type of device, having a motor, such as a pneumatic motor, a hydraulic motor, or an electric motor. In an example shown in FIG. 1, both of the feed structure 6 and the spindle 7 are air pressure type devices. Therefore, the feed structure 6 having the spindle 7 built-in is connected to a compressed air supply tank. As a matter of course, an electric type device may be used for one or both of the feed structure 6 and the spindle 7. In that case, at least one motor included in one or both of the feed structure 6 and the spindle 7 is connected to a power supply.

Thus, the robot 2 has the arm 4 possible to hold and rotate the tool T indirectly by the spindle 7 and move the tool T, which is held by the spindle 7, in two-dimensional or three-dimensional directions. Therefore, a workpiece W can be machined using the tool T by two-dimensional drive or three-dimensional drive of the arm 4.

Examples of the tool T held by the spindle 7 include not only chamfering cutter and a deburring tool but also various rotary machining tools, such as an end mill, a drill and a reamer. Therefore, desired cutting work of the workpiece W can be performed by the machining robot 1 to which the rotary tool T has been attached. As a concrete example, various cutting work including cutting off of the plate-like or block-like workpiece W, outline trim processing, outline rough processing, outline finish processing, groove processing, pocket processing to form a concave portion surrounded by flanges, rough processing of an inside of a flange, finish processing of an inside of a flange, drilling, chamfering and a deburring can be performed.

Meanwhile, examples of material of the workpiece W include composite materials, such as GFRP (Glass Fiber Reinforced Plastics) and CFRP (Carbon Fiber Reinforced Plastics), metals and other desired materials which may be targets for cutting work.

The copying guide 8 is a jig in the arm 4 side for copying, and therefore, attached in the arm 4 side in order to contact with a copying mold J1 placed in the workpiece W side. The copying guide 8 can have not only a guide contacting with the copying mold J1 in the tool diameter direction D for positioning the tool T in the tool diameter direction D, but also a guide contacting with the copying mold J1 in the tool axis AX direction for positioning the tool T in the tool axis AX direction.

In an example shown in FIG. 1 and FIG. 2, the copying guide 8 has a disk-shaped member 8A and a cylindrical part 8B. The disk-shaped member 8A has a through hole for passing the tool T. The cylindrical part 8B is coaxially formed on one surface of the disk-shaped member 8A. Then, the copying guide 8 having such a structure is fixed to the casing 6A of the feed structure 6 having the spindle 7 built-in. The disk-shaped member 8A functions as the guide for positioning the tool T in the tool axis AX direction by contacting with the copying mold J1 in the tool axis AX direction. Meanwhile, the cylindrical part 8B functions as the guide for positioning the tool T in the tool diameter direction D by contacting with the copying mold J1 in the tool diameter direction D. The tool T can be projected in the workpiece W side through the through hole formed along the center axis of the copying guide 8.

The copying guide 8 may be rotatably attached to the arm 4 side with a rotating structure, such as a bearing. Nevertheless, when the workpiece W is made of CFRP, powder dust of carbon may jam a clearance in the bearing. For that reason, fixing the copying guide 8 to the arm 4 side without any spindle, such as a bearing, makes it possible to simplify the configuration of the copying guide 8 and prevent powder dust of composite material from entering a rotating structure. Alternatively, the copying guide 8 may be rotatably attached to the arm 4 side with a shielded bearing which has a structure to prevent powder dust from entering its inside.

The form of the copying guide 8 and the position at which the copying guide 8 is attached to the arm 4 can be freely determined according to a form and a position of the copying mold J1 placed in the workpiece W side as well as a form and a position of the workpiece W itself.

The copying mold J1 is a jig for copying, which is placed in the workpiece W side. In particular, the copying mold J1 has a surface contacting with the copying guide 8 in the tool diameter direction D and a surface contacting with the copying guide 8 in the tool axis AX direction. Therefore, the tool T can be positioned in both of the tool diameter direction D and the tool axis AX direction by contacting the two contact surfaces of the copying mold J1 with the copying guide 8. Then, outline copying of the workpiece W can be performed using the tool T by moving the arm 4 while bringing the copying guide 8 in the arm 4 side in contact with the copying mold J1 placed in the workpiece W side.

In an example shown in FIG. 2, an I-section stringer which is one of aircraft parts is the workpiece W. The I-section stringer is a stringer of which cross section is I-shaped. Specifically, the I-section stringer has a structure in which two flanges are formed in both end sides of a web. Then, FIG. 2 shows an example where an I-section stringer is produced by cutting off a flange part of material of which cross section is I-shaped.

Therefore, one flange which is the lower part of the workpiece W is placed on a platy jig J3 fixed on a work table J2. Furthermore, the platy copying mold J1 is placed on the other flange which is the upper part of the workpiece W. The form of the copying mold J1 is offset from the form of the workpiece W after machining, by a distance between the surface of the copying guide 8 contacting with the copying mold J1 and a cutting face of the tool T. That is, an end face is formed on the copying mold J1 so that the end face becomes offset from a position of the end face of the flange after machining, by a constant distance according to a structure of the copying guide 8.

For a concrete example, when outline processing is performed by the tool T whose diameter is 10 mm, the diameter of the cylindrical part 8B of the copying guide 8 can be determined to 14 mm to 15 mm. In that case, the distance between the side face of the cylindrical part 8B of the copying guide 8 and the cutting face of the tool T is 2 mm to 2.5 mm. Therefore, the offset amount between the end face of the copying mold J1 and the form of the workpiece W after machining is set to 2 mm to 2.5 mm.

When a force in the plate thickness direction of the flange is applied with the flange, the tip of the flange may strain. For that reason, it is desirable to dispose a jack J4 between the lower flange and the upper flange in order to reinforce the flanges, as exemplified by FIG. 2.

Then, the arm 4 can be moved with making the stepped cylindrical copying guide 8 attached in the arm 4 side contact with the platy copying mold J1 placed in the workpiece W side. Thereby, outline trim copying processing by which a platy part of the workpiece W is cut off with the tool T, such as an end mill or a router bit, can be performed.

Specifically, copying of the workpiece W with precisely positioning the tool T in the tool diameter direction D perpendicular to both of the feed direction F of the tool T and the tool axis AX can be performed by moving the arm 4 while making the curved surface of the cylindrical part 8B of the copying guide 8 contact on the end face of the platy copying mold J1. Meanwhile, copying of the workpiece W with precisely positioning the tool T in the tool axis AX direction can be performed by moving the arm 4 while making the plane surface of the disk member 8A of the copying guide 8 contact on the upper surface of the platy copying mold J1. In other words, the structure of the copying mold J1 for the outline copying can be a simple platy structure when the structure of the copying guide 8 is a stepped cylindrical structure.

As a matter of course, besides an example shown in FIG. 2, copying can be performed for a part having a desired structure. In case of an aircraft part, for example, a spar, a rib, a panel or an assembly thereof as well as a stringer having various cross section forms, such as I-section, T-section and hat-shaped, can be the workpiece W to be an object of copying. For example, outline copying, such as outline trim processing of a panel, trim processing of an end face of a flange, inner surface processing of a flange and outer surface processing of a flange, can be performed. Moreover, outline copying with the machining robot 1 can be performed in order to produce a desired product or semi-product, such as an automobile part or a railroad vehicle part, as well as an aircraft part.

Therefore, the form and position of the copying mold J1 can also be determined freely according to a form and position of the workpiece W as well as the form and position of the copying guide 8 attached in the arm 4 side.

Moreover, the arm 4 is provided with force sensors 9 for detecting forces applied on the arm 4. The force sensors 9 detect forces applied on the arm 4 at least from the tool T. Specifically, when outline working of the workpiece W is performed by the cutting edges formed on the side face of the tool T, a reaction force, including main components in the feed direction F of the tool T and the tool diameter direction D perpendicular to the feed direction F of the tool T, acts on the tool T from the workpiece W. Meanwhile, when the end cutting edges of the tool T are also used for cutting work, like groove processing, and when a cutting surface is not parallel to the tool axis AX direction, like working with a chamfering cutter or an inverse chamfering cutter, a reaction force, including components in not only the feed direction F of the tool T and the tool diameter direction D perpendicular to the feed direction F of the tool T but also in the tool axis AX direction, acts on the tool T from the workpiece W.

In addition, a reaction force having main components in the tool axis AX direction and the tool diameter direction D acts on the copying guide 8 from the copying mold J1. As a result, as a reaction force form the workpiece W and the copying mold J1, a three-dimensional reaction force, consisting of components in the feed direction F of the tool T, the tool diameter direction D perpendicular to the feed direction F of the tool T and the tool axis AX direction, is applied on the arm 4 indirectly through the tool T, the spindle 7 and the feed structure 6.

Accordingly, the force sensors 9 possible to detect forces in three axis directions orthogonal to each other can be attached to the attachment jig 5 on the tip of the arm 4. In an example shown in FIG. 1, the attachment jig 5 has been attached to the arm 4 via the stepped disk-like force sensors 9. Thereby, during the outline copying of the workpiece W using the tool T by moving the arm 4 while making the coping guide 8 contact with the copying mold J1 placed in the workpiece W side, the forces applied on the arm 4 from the tool T can be detected by the force sensors 9. In addition, the forces applied on the arm 4 from the copying mold J1 during the outline copying of the workpiece W can also be detected by the force sensors 9.

Note that, in an example shown in FIG. 1, the casing 6A of the feed structure 6 housing the spindle 7 for rotating the tool T has been attached to the attachment jig 5 so that the tool axis AX may be perpendicular to the connection face of the force sensors 9 while the casing 6A of the feed structure 6 housing the spindle 7 for rotating the tool T has been attached to the attachment jig 5 so that the tool axis AX may be parallel to the connection face of the force sensors 9 in an example shown in FIG. 2. Thus, the attaching direction of the tool T, the spindle 7, and the feed structure 6 to the arm 4 can be freely determined according to the respective structures of the workpiece W, the copying guide 8 and the copying mold J1.

When the feed direction F of the tool T, the tool diameter direction D perpendicular to the feed direction F of the tool T and the tool axis AX direction are made to coincide with or made related to three axis directions in which the force sensors 9 can detect forces, the respective components of the reaction force in the feed direction F of the tool T, the tool diameter direction D perpendicular to the feed direction F of the tool T and the tool axis AX direction can be detected by the force sensors 9. As a concrete example, when the forces in the X axis direction, the Y axis direction and the Z axis direction orthogonal to each other can be detected by the force sensors 9, as shown in FIG. 2, the tool T can be attached to the arm 4 so that the feed direction F of the tool T may be parallel to the X axis direction, the tool diameter direction D perpendicular to the feed direction F of the tool T may be parallel to the Y axis direction and the tool axis AX direction may be parallel to the Z axis direction.

The forces detected by the force sensors 9 respectively are output to the control system 3. The control system 3 is configured to control the arm 4 based on the forces detected by the force sensors 9 respectively.

Figure 3:
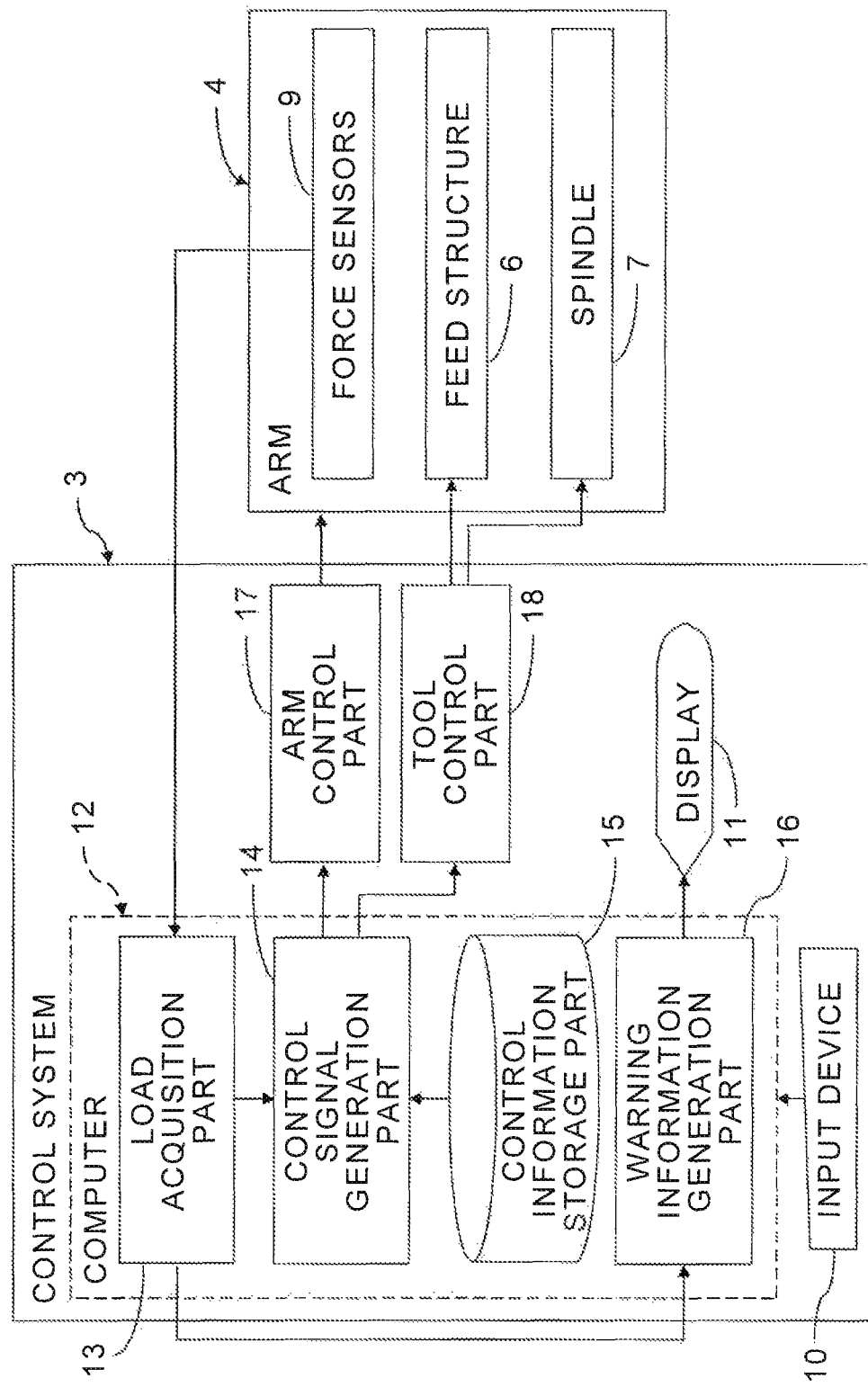
FIG. 3 is a functional block diagram of the control system included in the machining robot shown in FIG. 1.

FIG. 3 is a functional block diagram of the control system 3 included in the machining robot 1 shown in FIG. 1.

The control system 3 can be composed of an input device 10, a display 11 and a computer 12 to which the input device 10 and the display 11 are attached. The processing unit, such as CPU (central processing unit), of the computer 12 functions as a load acquisition part 13, a control signal generation part 14, a control information storage part 15 and a warning information generation part 16 by reading and executing control program of the robot 2.

The control system 3 also has an arm control part 17 and a tool control part 18. The arm control part 17 may be provided as a function of the computer 12. That is, common processing circuitry may be used for having control program for configuring the arm control part 17 read, in addition to for providing the functions of the load acquisition part 13, the control signal generation part 14, the control information storage part 15 and the warning information generation part 16.

The load acquisition part 13 has a function to obtain the forces detected by the force sensors 9 and notify the control signal generation part 14 and the warning information generation part 16 of the obtained force. Specifically, the load acquisition part 13 obtains the forces, consisting of force component in the feed direction F of the tool T, force component in the tool diameter direction D perpendicular to the feed direction F of the tool T and force component in the tool axis AX direction, from the force sensors 9 and the obtained forces having the components in the three directions are notified to the control signal generation part 14 and the warning information generation part 16.

The control signal generation part 14 has a function for controlling the arm 4, the feed structure 6 and the spindle 7 based on machining control program stored as control information in the control information storage part 15.

In order to perform cutting work of the workpiece W by the machining robot 1 holding the rotary tool T, it is required to control the feed structure 6 and the spindle 7 besides controlling the arm 4. Thus, machining control program which consists of control program of the arm 4, control program of the feed structure 6 and control program of the spindle 7 can be generated and the generated machining control program can be stored as control information of the machining robot 1 in the control information storage part 15.

Meanwhile, the control signal generation part 14 can have a function to refer to the machining control program stored in the control information storage part 15 to generate the respective control signals of the arm 4, the feed structure 6 and the spindle 7 according to the machining control program so that the generated control signal of the arm 4 can be output to the drive part of the arm 4 through the arm control part 17 while the generated control signals of the feed structure 6 and the spindle 7 can be output to the feed structure 6 and the spindle 7 through the tool control part 18 respectively.

In particular, the control signal generation part 14 has a function to generate control signals of the arm 4 for outline copying, based on the forces notified from the load acquisition part 13 and control program of the arm 4 for the outline copying, and to automatically control the arm 4 by outputting the generated control signals to the arm 4 so that the outline copying may be performed.

The control program of the arm 4 for outline copying teaches an orbital and movement speed of the arm 4 so that the copying guide 8 may move while contacting with the copying mold J1. That is, the control program for outline copying teaches a moving direction and moving speed of the arm 4 by designating teaching positions and teaching speeds. Therefore, the control program for outline copying is generated based on form information of the copying mold J1.

For example, when the copying mold J1 is used for linear machining, control program for outline copying which teaches spatial positions and moving directions of the arm 4 can be generated based on spatial positions of the surface of the copying mold J1 contacting with the copying guide 8. Meanwhile, when the copying mold J1 is used for curved machining or machining with change of the tool axis AX direction, control program for outline copying which teaches spatial positions and moving directions of the arm 4 can be generated based on two dimensional or three dimensional form information of the surface of the copying mold J1 contacting with the copying guide 8.

The generated control program of the arm 4 for outline copying can be stored in the control information storage part 15 so that the control signal generation part 14 can refer to the control program in a case of performing the outline copying of the workpiece W. As mentioned above, the control signal generation part 14 is configured to generate control signals of the arm 4 not only based on control program of the arm 4 for outline copying but based on the forces obtained from the force sensors 9 through the load acquisition part 13, in a case of performing outline copying of the workpiece W.

The control signal generation part 14 can obtain forces, having components consisting of force in the feed direction F of the tool T, force in the tool diameter direction D perpendicular to the feed direction F of the tool T and force in the tool axis AX direction, from the force sensors 9 through the load acquisition part 13. As exemplified in FIG. 2, when the feed direction F of the tool T, the tool diameter direction D perpendicular to the feed direction F of the tool T and the tool axis AX direction respectively coincide with the X axis direction, the Y axis direction and the Z axis in which the force sensors 9 can detect forces, the force in the feed direction F of the tool T, the force in the tool diameter direction D perpendicular to the feed direction F of the tool T and the force in the tool axis AX direction can be obtained directly based on the forces consisting of three orthogonal components obtained from the force sensors 9 through the load acquisition part 13.

Meanwhile, when the feed direction F of the tool T, the tool diameter direction D perpendicular to the feed direction F of the tool T and the tool axis AX direction are respectively inclined or rotated relative to the X axis direction, the Y axis direction and the Z axis direction, in which the force sensors 9 can detect forces, by an unchanged known angle or unchanged known angles, the force in the feed direction F of the tool T, the force in the tool diameter direction D perpendicular to the feed direction F of the tool T and the tool axis AX direction can be obtained by coordinate transformation processing.

Furthermore, even when geometric positional relationship between the directions, consisting of the feed direction F of the tool T, the tool diameter direction D perpendicular to the feed direction F of the tool T and the tool axis AX direction, and the directions, consisting of the X axis direction, the Y axis direction and the Z axis direction in which the force sensors 9 can detect forces, changes during copying, the feed direction F of the tool T, the tool diameter direction D perpendicular to the feed direction F of the tool T and the tool axis AX direction can be specified based on form information of at least one of the copying mold J1 and the workpiece W after machining. Therefore, the force in the feed direction F of the tool T, the force in the tool diameter direction D perpendicular to the feed direction F of the tool T and the force in the tool axis AX direction can be calculated by coordinate transformation processing.

Figure 4:
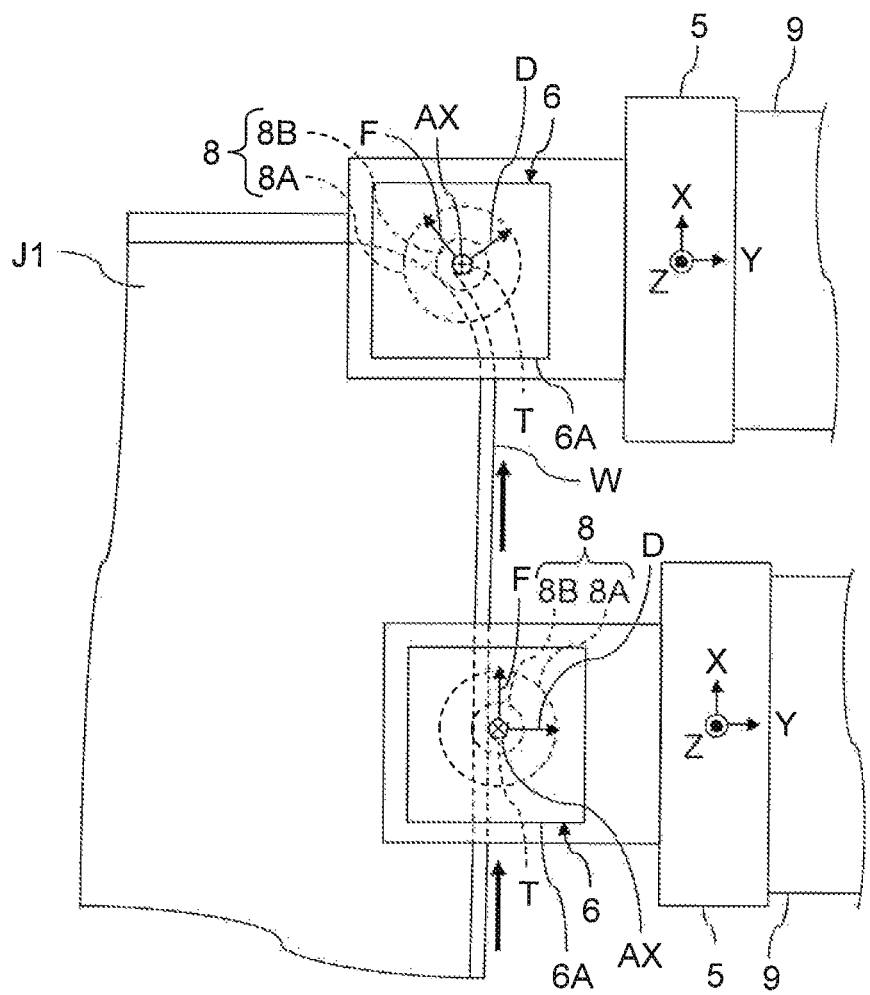
FIG. 4 explains a method for obtaining the reaction force in the feed direction and the reaction force in the tool diameter direction of the tool when the feed direction of the tool changes during outline copying using the machining robot shown in FIG. 2.

FIG. 4 explains a method for obtaining the reaction force in the feed direction F and the reaction force in the tool diameter direction D of the tool T when the feed direction F of the tool T changes during outline copying using the machining robot 1 shown in FIG. 2.

When trimming processing of an outline shape having a round chamfered corner is performed by coping using the copying mold J1, the feed direction F of the tool T changes in a tangential direction of the outline form of the workpiece W after machining and the copying mold J1, as shown in FIG. 4. In the case, the direction of the reaction force acting on the copying guide 8 in the tool diameter direction D becomes a normal direction perpendicular to the cut surface of the workpiece W, i.e., the surface of the workpiece W after machining and the surface of the copying mold J1.

Therefore, when the outline trim processing is performed with fixing the tool axis AX direction to the Z axis direction without changing the directions of the force sensors 9, the relative relation between the set of the X axis direction and the Y axis direction, in which the force sensors 9 can detect forces, and the set of the feed direction F of the tool T and the tool diameter direction D, in which the copying guide 8 receive the reaction force, changes.

In such a case, a direction perpendicular to the face of the workpiece W after machining or the face of the copying mold J1 can be specified, as the tool diameter direction D in which the tool T and the copying guide 8 receive reaction forces from the workpiece W and the copying mold J1 respectively, based on a two dimensional form of the copying mold J1 or the workpiece W after machining. Alternatively, a direction perpendicular to the face of the workpiece W and the face of the copying mold J1 may be specified, as the tool diameter direction D in which the tool T and the copying guide 8 receive reaction forces from the workpiece W and the copying mold J1 respectively, based on teaching positions of the tool T identified based on the control program of the arm 4. Thus, a reaction force in the specified tool diameter direction D can be calculated by vector calculation based on respective detection values of forces in the X axis direction and the Y axis direction.

Figure 5:
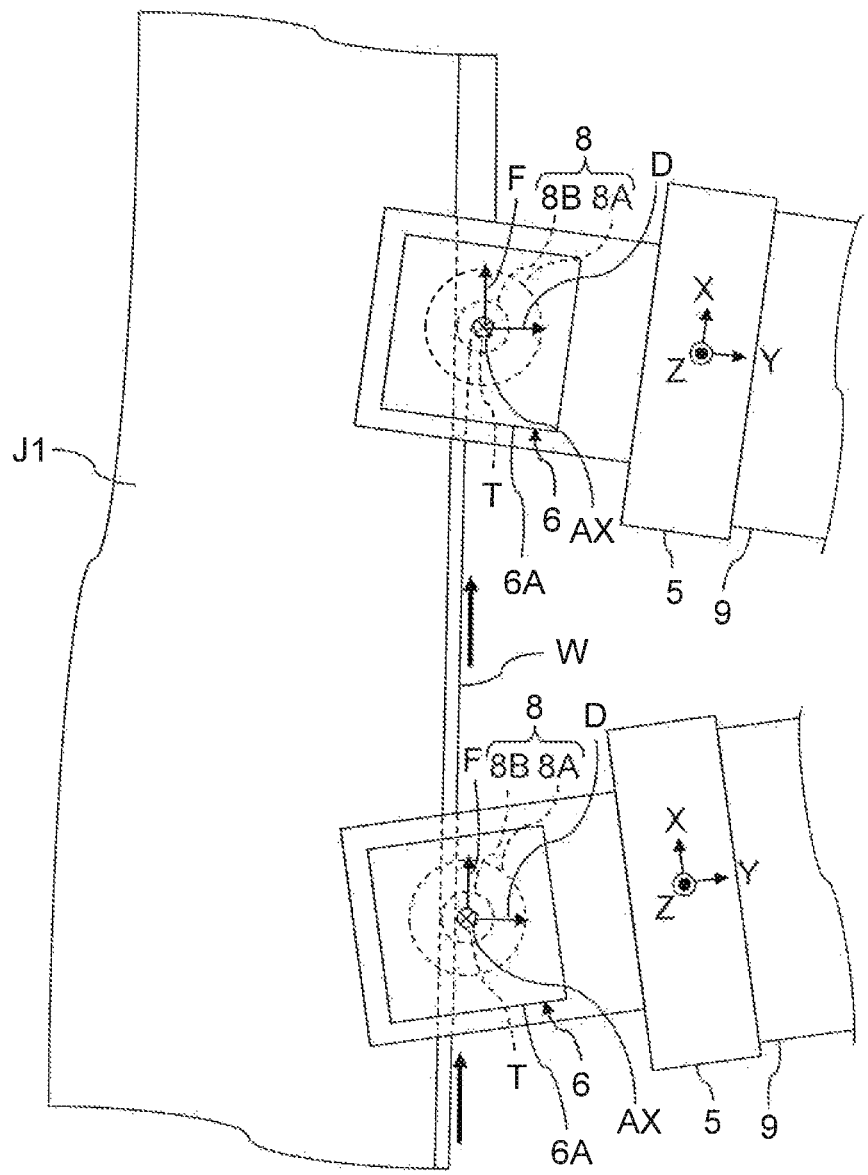
FIG. 5 shows an example case where the directions of the force sensors change even when the feed direction of the tool does not change during outline copying using the machining robot shown in FIG. 2.

FIG. 5 shows an example case where the directions of the force sensors 9 change even when the feed direction F of the tool T does not change during outline copying using the machining robot 1 shown in FIG. 2.

As shown in FIG. 5, the directions of the force sensors 9 change depending on positions of driving shafts included in the arm 4 even when the feed direction F of the tool T does not change during outline copying. Specifically, in a case where the force sensors 9 cannot be moved in parallel in the feed direction F of the tool T caused by restrictions in the driving shafts of the arm 4, directions of the force sensors 9 change even when the feed direction F of the tool T is linear and does not change. Even in such a case, a direction perpendicular to the face of the workpiece W and the face of the copying mold J1 can be also specified, as the tool diameter direction D in which the tool T and the copy guide 8 receive reaction forces from the workpiece W and the copying mold J1 respectively, based on a form of the copying mold J1 in addition to a form of the workpiece W after machining or teaching positions of the tool T. Then, a reaction force in the specified tool diameter direction D can be calculated by vector calculation based on respective detection values of forces in the X axis direction and the Y axis direction.

Note that, the feed direction F of the tool T, the tool diameter direction D perpendicular to the feed direction F of the tool T and the tool axis AX direction may be detected based on time changes in forces detected as three vector components by the force sensors 9. In that case, a force in the feed direction F of the tool T, a force in the tool diameter detection D perpendicular to the feed direction F of the tool T and a force in the tool diameter AX direction can be obtained without the form information on the copying mold J1 and the workpiece W.

The control signal generation part 14 has a function to obtain a force in the feed direction F of the tool T, a force in the tool diameter direction D perpendicular to the feed direction F of the tool T and a force in the tool axis AX, based on forces detected by the force sensors 9, under the above-mentioned method. Thereby, the control signal generation part 14 can control the arm 4 according to directions of forces applied on the arm 4.

For example, the higher the feeding speed in the feed direction F of the tool T becomes during cutting working of the workpiece W, the more the cutting resistance and the reaction force from the workpiece W to the tool T increase. Moreover, the reaction force from the workpiece W to the tool T increases in a case where the thickness of the platy workpiece W changes or cutting width of the workpiece W become larger even when the feeding speed in the feed direction F of the tool T is constant. Furthermore, the reaction force from the workpiece W to the tool T also increases when the tool T has been worn out and sharpness of the tool T has deteriorated.

When the reaction force applied on the tool T from the workpiece W becomes excessive, a vibration, such as a chatter vibration, arises in the tool T. When a vibration arises in the tool T, the surface roughness of each machined face becomes rough and that leads to quality degradation of a product or a semi-product obtained as the workpiece W after machining even when the product or the semi-product has been produced by outline copying using the copying guide 8 and the copying mold J1. Therefore, it is important to prevent an excessive reaction force from applying on the tool T in order to secure a required quality of a product or a semi-product product. What is necessary in order to decrease the reaction force applied on the tool T is to decrease the feeding speed in the feed direction F of the tool T.

Reversely, to reduce the feeding speed in the feed direction F of the tool T too much leads to an increase in processing time of the workpiece W, that is, degradation in processing efficiency. Therefore, it is preferable to increase the feeding speed in the feed direction F of the tool T within such a range that the reaction force applied on the tool T does not become excessive, from a viewpoint of improving processing efficiency of the workpiece W.

That is, an ideal feeding speed in the feed direction F of the tool T changes depending on processing conditions of the workpiece W when processing quality of the workpiece W is secured while processing efficiency of the workpiece W is improved at the same time. On the other hand, changing the teaching speed of the arm 4 depending on processing conditions in control program of the arm 4 requires very complicated and unrealistic processing accompanying setting of many parameters for defining the processing conditions.

Accordingly, the control signal generation part 14 can be configured to generate control signals of the arm 4 for outline copying, based on the force in the feed direction F of the tool T directly measured by one of the force sensors 9 or indirectly obtained with processing, such as coordinate transformation, using the force sensors 9 so that the feed speed of the tool T becomes to a predetermined control value. That is, the feed speed of the tool T can be automatically adjusted so that the reaction force in the feed direction F of the tool T may not be excessive during outline copying.

Concrete examples of a method of automatically adjusting the feed speed of the tool T include a method of automatically controlling the feed speed of the tool T so that the reaction force in the feed direction F of the tool T may be within a predetermined range. In that case, the control signal generation part 14 has only to determine a control value of the feed speed of the tool T so that the force in the feed direction F of the tool T obtained using at least one of the force sensors 9 may become constant or within a predetermined range, and generate control signals of the arm 4 for outline copying so that the feed speed of the tool T may become the determined control value of the feed speed of the tool T. That is, what is necessary is to perform a feedback control of the feed speed of the tool T by which the force in the feed direction F of the tool T is made constant or within a predetermined range.

Actually, outline trim processing tests of the workpiece W made of CFRP were performed using diamond tools and carbide tools as the tool T. As a result, it was confirmed that satisfactory cut faces could be made without an extreme vibration in the tool T under the following conditions. In a case of using a diamond tool as the tool T, the movement speed of the arm 4 should be automatically adjusted so that the reaction force to the diamond tool may be not less than 3 kgf and not more than 10 kgf. Meanwhile, in a case of using a carbide tool as the tool T, the movement speed of the arm 4 should be automatically adjusted so that the reaction force to the carbide tool may be not less than 3 kgf and not more than 5 kgf. When outline trim copying processing is performed to the workpiece W made of CFRP, it is preferable to produce a product or semi-product made of composite material by outline trim processing of the workpiece W under the above-described conditions.

The cemented carbide is obtained by sintering tungsten carbide powder, to which additive materials, such as titanium carbide and/or tantalum carbide, have been added, with cobalt. Meanwhile, a diamond tool is obtained by molding a single crystal of diamond or made of a polycrystalline sintered body obtained by sintering diamond fine powder to which an additive material, such as cobalt, has been added.

Another concrete example of the method of automatically adjusting the feed speed of the tool T is a method of changing the feed speed of the tool T to a speed preset according to the force in the feed direction F of the tool T.

Figure 6:
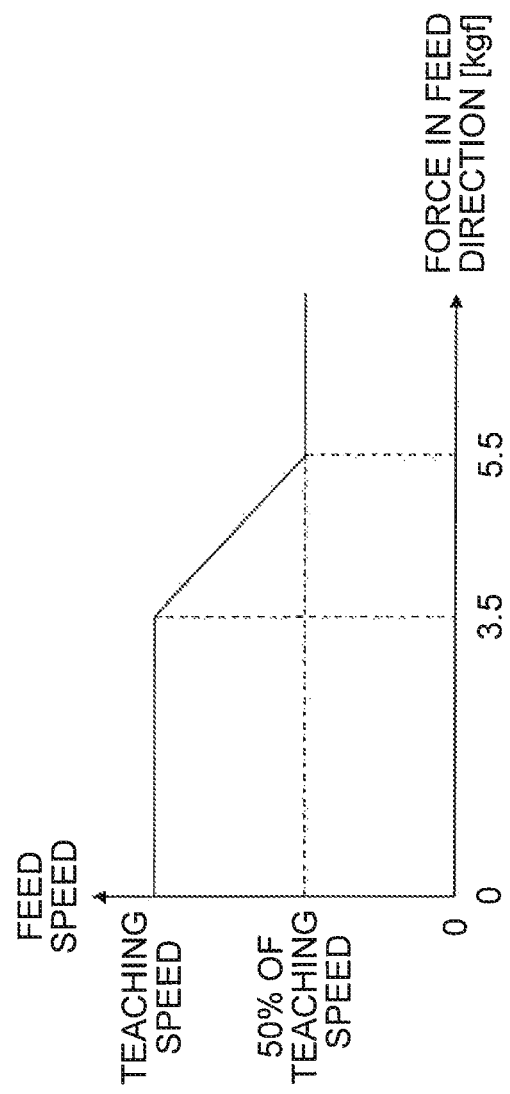
FIG. 6 shows a graph for explaining a method for controlling the arm of the machining robot shown in FIG. 1.

FIG. 6 shows a graph for explaining a method for controlling the arm 4 of the machining robot 1 shown in FIG. 1.

In FIG. 6, the horizontal axis shows detected values of the force (kgf) applied in the feed direction F of the tool T while the vertical axis shows control values of the feed speed of the tool T. As shown in FIG. 6A, a table or function relating forces, applied on the arm 4 in the feed direction F of the tool T, with control values of the feed speeds of the tool T can be prepared. The created table or function can be stored in the control information storage part 15.

In an example shown in FIG. 6, when the force in the feed direction F of the tool T is not more than 3.5 kgf, the feed speed of the tool T has been determined to be a teaching speed given as a parameter in control program by a user since the reaction force from the workpiece W is small. Meanwhile, when the force in the feed direction F of the tool T is not less than 5.5 kgf, the feed speed of the tool T has been determined to be 50% of the teaching speed from a viewpoint of suppressing vibration of the tool T since the reaction force from the workpiece W is large. Moreover, when the force in the feed direction F of the tool T is not less than 3.5 kgf and not more than 5.5 kgf, the feed speed of the tool T has been determined to vary linearly from 100% to 50% of the teaching speed. That is, FIG. 6 shows an example case where feed speed control program of the tool T has been generated so that the feed speed of the tool T may automatically slow down gradually to 50% of a teaching speed when the force in the feed direction F of the tool T exceeds a threshold value.

As a matter of course, forces applied on the arm 4 from the feed direction F of the tool T may be related to control values of feed speeds of the tool T by a desired function or the like according to a result of cutting examination or the like, not limited to an example shown in FIG. 6. For example, as the force applied from the feed direction F of the tool T increases, the control value of feed speed of the tool T can be decreased in a stepwise shape or a curved shape. Alternatively, a table in which numerical values of forces applied from the feed direction F of the tool T have been related with numerical control values of feed speeds of the tool may be prepared.

Thus, when a table or a function in which forces applied on the arm 4 from the feed direction F of the tool T are associated with control values of feed speeds of the tool T is prepared and stored in the control information storage part 15, the control signal generation part 14 can determine a control value of feed speed of the tool T, corresponding to the force in the feed direction F of the tool T obtained actually using the force sensors 9 during outline copying, based on the table or the function stored in the control information storage part 15. Then, the control signal generation part 14 can generate control signals of the arm 4 for outline copying so that the feed speed of the tool T may become the determined control value of feed speed of the tool T.

When the force applied on the arm 4 from the feed direction F of the tool T is extremely large, vibration of the tool T may not suppressed sufficiently even when the feed speed of the tool T is reduced. For that reason, a function to interrupt outline copying by stopping movement of the arm 4 when the force in the feed direction F of the tool T obtained by the load acquisition part 13 has become not less than a threshold value or has exceeded a threshold value can be provided with the control signal generation part 14. Specifically, the control signal generation part 14 may have a function to generate control signals for stopping movement of the arm 4 to output the generated control signals to the arm control part 17 when the force in the feed direction F of the tool T obtained by the load acquisition part 13 has become not less than a threshold value or has exceeded a threshold value.

As a matter of course, control for stopping movement of the arm 4 can also be performed when at least one of the force in the tool diameter direction D perpendicular to the feed direction F of the tool T and the force in the tool axis AX direction has become not less than a threshold value or has exceeded a threshold value, from a viewpoint of avoiding an interference between the tool T and the copying guide 8 or the like because of a setting error of the workpiece W and/or the copying mold J1.

As mentioned above, the control signal generation part 14 can obtain not only the reaction force in the feed direction F of the tool T but also the reaction force in the tool diameter direction D perpendicular to the feed direction F of the tool T and the reaction force in the tool axis AX direction. Therefore, the control signal generation part 14 can perform not only feedback control of the arm 4 based on the reaction force in the feed direction F of the tool T but also feedback control of the arm 4 based on the reaction force in the tool diameter direction D perpendicular to the feed direction F of the tool T and feedback control of the arm 4 based on the reaction force in the tool axis AX direction.

The rigidity of the arm 4 having a cantilever structure is extremely small compared with the rigidity of a spindle of a machine tool. Therefore, an error arises between an actual position of the tool T and a teaching position of the tool T directed by control program, due to bending of the arm 4 caused by the reaction force by cutting, the own weight and the like, if the arm 4 is controlled only according to the control program. Such error caused by positioning accuracy of the arm 4 is not negligible for cutting work of the workpiece W requiring processing accuracy in which a tolerance is about ±0.1 mm to ±1.0 mm. In a case of outline copying, the copying guide 8 may not contact with the copying mold J1 steadily if the arm 4 is controlled only according to control program.

For that reason, force control of the arm 4 base on the reaction force in the tool diameter direction D perpendicular to the feed direction F of the tool T and force control of the arm 4 based on the reaction force in the tool axis AX direction can also be performed. Thereby, the copying guide 8 can be steadily pressed against the copying mold J1 with an appropriate force during copying.

Specifically, the control signal generation part 14 can determine a control value of position of the tool T in the tool diameter direction D perpendicular to the feed direction F of the tool T so that the force, in the tool diameter direction D perpendicular to the feed direction F of the tool T, obtained using the force sensors 9 may become constant or within a predetermined range. More specifically, correction for offsetting teaching positions of the tool T instructed by control program in the tool diameter direction D perpendicular to the feed direction F of the tool T can be performed so that the reaction force in the tool diameter direction D perpendicular to the feed direction F of the tool T may become constant or within a predetermined range, and the corrected positions by the correction can be set as control values of the positions in the tool diameter direction D perpendicular to the feed direction F of the tool T. Then, control signals of the arm 4 for outline copying can be generated and output to the arm control part 17 so that the positions of the tool T in the tool diameter direction D perpendicular to the feed direction F of the tool T may become the set control values of the positions in the tool diameter direction D perpendicular to the feed direction F of the tool T.

That is, a feedback control of the arm 4 can be performed so that the reaction force in the tool diameter direction D, applied on the copying guide 8 and the tool T from the copying mold J1 and the workpiece W, may become constant or within a predetermined range. Thereby, the copying guide 8 can be certainly pressed against the copying mold J1 in the tool diameter direction D, with an appropriate force which is constant or within a predetermined range, during copying.

In the same way, the control signal generation part 14 can determine a control value of position in the tool axis AX direction of the tool T so that the force in the tool axis AX direction of the tool T obtained using the force sensors 9 may become constant or within a predetermined range. Specifically, correction for offsetting teaching positions of the tool T instructed by the control program so that the reaction force in the tool axis AX direction may become constant or within a predetermined range, and the corrected positions by the correction can be set as control values of positions of the tool T in the tool axis AX direction of the tool T. Then, control signals of the arm 4 for outline copying can be generated and output to the arm control part 17 so that the positions of the tool T in the tool axis AX direction of the tool T may be the set control values of the positions in the tool axis AX direction of the tool T.

That is, a feedback control of the arm 4 can be performed so that the reaction force in the tool axis AX direction, applied on the copying guide 8 from the copying mold J1, may become constant or within a predetermined range. Thereby, the copying guide 8 can be certainly pressed against the copying mold J1 in the tool axis AX direction, with an appropriate force which is constant or within a predetermined range, during copying.

When the force control for pressing the copying guide 8 on the copying mold J1 with an appropriate force, which is constant or within a predetermined range, is performed in at least one of the tool diameter direction D or the tool axis direction AX, the copying mold J1 and the workpiece W have to have strengths not so as to be deformed by the applied force respectively. Moreover, it is necessary to fix the copying mold J1 and the workpiece W so that positions thereof may not shift due to a force given by the force control respectively. On the other hand, it is necessary to determine the force applied by the force control as a force by which the copying mold J1 and the workpiece W do not deform and shift.

By the way, positioning of the tool T in the tool axis AX direction can be performed by not only movement of the arm 4 but operation of the feed structure 6. Accordingly, the control signal generation part 14 can automatically control the feed structure 6 based on the reaction force of the tool T in the tool axis AX direction obtained using the force sensors 9.

Typical examples of positioning of the tool T in the tool axis AX direction preferably performed by operation of the feed structure 6A include drilling. This is because the positioning of the tool T in the tool axis AX direction by linear operation of the feed structure 6 is far accurate compared with that by linear movement of the arm 4 accompanied by interpolation processing, for drilling.

For that reason, when the workpiece W is drilled by the tool T, the control signal generation part 14 can determine a control value of feeding speed of the feed structure 6 so that the force in the tool axis AX direction of the tool T obtained using the force sensors 9 may be constant or within a predetermined range, and generate control signals for drilling of the feed structure 6 to output them to the feed structure 6 so that the feeding speed of the feed structure 6 becomes the determined control value of the feeding speed. Thereby, drilling the workpiece W by the tool T can be performed with the reaction force in the tool axis AX direction of the tool T as constant as possible.

The arm control part 17 of the control system 3 has a function to control the arm 4 by outputting control signals of the arm 4, generated by the control signal generation part 14, to the respective drive parts of the arm 4. Meanwhile, the tool control part 18 has a function to control the feed structure 6 and the spindle 7 by outputting control signals of the feed structure 6 and the spindle 7, generated by the control signal generation part 14, to the feed structure 6 and the spindle 7 respectively. When both of the feed structure 6 and the spindle 7 are pneumatic types as exemplified in FIG. 1, the tool control part 18 is provided with a function to convert control signals generated by the control signal generation part 14, from electric signals to air signals, to output the converted control signals to the feed structure 6 and the spindle 7 respectively.

The warning information generation part 16 has a function to obtain the force in the feed direction F of the tool T, based on the forces obtained by the load acquisition part 13, and to output warning information as a warning message to the display 11 when the force in the feed direction F of the tool T has been not less than a threshold value or has exceeded a threshold value. Note that, the warning information may be output to an output device, such as a lamp or a speaker, as lights, a warning sound or a voice message, instead of the display 11 or in addition to the display 11.

When the force applied on the arm 4 from the feed direction F of the tool T is excessive, the tool T vibrates which may lead to deterioration in processing quality as mentioned above. For that reason, warning information can be output before the arm 4 stops. As a matter of course, warning information can be also output before the arm 4 stops when one of the force in the tool diameter direction D perpendicular to the feed direction F of the tool T and the force in the tool axis AX direction has become not less than a threshold value or more than a threshold value, from a viewpoint of avoiding interference between the tool T and the copying guide 8 by failure in setting the workpiece W and the copying mold J1, or the like.

It is appropriate to set a threshold value for determining whether warning information should be output, in the warning information generation part 16, to be lower than that for determining whether the arm 4 should be stopped, in the control signal generation part 14. Specifically, the warning information generation part 16 can be adapted to output warning information when the force obtained by the load acquisition part 13 has been not less than or more than the first threshold value while the control signal generation part 14 can be adapted to stop movement of the arm 4 when the force obtained by the load acquisition part 13 has not less than or more than the second threshold value larger than the first threshold value.

When the threshold value processing is performed for each of the force in the feed direction F of the tool T, the force in the tool diameter direction D perpendicular to the feed direction F of the tool T and the force in the tool axis AX direction, the first threshold value and the second threshold value are set for each of the force in the feed direction F of the tool T, the force in the tool diameter direction D perpendicular to the feed direction F of the tool T and the force in the tool axis AX direction.

The whole part or a part of the control program to realize the above-mentioned functions of the control system 3 may be recorded on an information recording medium so as to be distributed as a program product. For example, control program for making the control system 3 execute a step for obtaining the forces applied on the arm 4, detected by the force sensors 9 during outline copying; and a step for generating control signals of the arm 4 for the outline copying, based on the obtained forces and control information of the arm 4 for the outline copying, and automatically controlling the arm 4 by outputting the generated control signals to the arm 4 so that the outline copying are performed can be distributed as a program product. Then, the control function for outline copying can be added to a conventional robot by making a control system of the conventional robot read the control program of the robot 2. Therefore, the machining robot 1 can be configured by attaching the feed structure 6, the spindle 7, the copying guide 8 and the tool T to the conventional robot.

(Machining Method with Machining Apparatus)

In a case of outline copying of the workpiece W by controlling the robot 2 which is an example of a machining apparatus, the workpiece W is set and the copying mold J1 is set at a predetermined position in the workpiece W side. As a concrete example, the workpiece W is fixed to the platy jig J3 fixed on the work table J2 and the copying mold J1 is fixed on the workpiece W, as shown in FIG. 2. On the other hand, the feeding structure 6, the spindle 7, the copying guide 8 and the rotating tool T are attached to the arm 4, having the force sensors 9, with the attaching jig 5.

Moreover, control program for teaching a track of the arm 4 so as to move the copying guide 8 in contact with the copying mold J1 is created by a user. The created control program of the arm 4 is written in the control information storage part 15 by operation of the input device 10 as machining control program, together with control program of the feed structure 6 and control program of the spindle 7.

Then, according to the control program of the arm 4 stored in the control information storage part 15, the control signal generation part 14 generates initial control signals of the arm 4, for moving the tool T along a pass which has been offset, as much as the thickness of the copying guide 8, from the end face of the copying mold J1. The generated initial control signals of the arm 4 are output to the driving parts of the arm 4 through the arm control part 17.

Meanwhile, according to the control program of the feed structure 6 and the control program of the spindle 7 each stored in the control information storage part 15, the control signal generation part 14 generates control signals of the feed structure 6 and the spindle 7 respectively so that the tool T may rotate in a state where the tip of the tool T has been fed to a required position. The generated control signals of the feed structure 6 and the spindle 7 are output to the feed structure 6 and the spindle 7 through the tool control part 18 respectively.

Therefore, the arm 4 moves so that the tool T moves to an initial teaching position. Meanwhile, the tip of the tool T is fed to the required position and the tool T rotates.

The control signal generation part 14 continuously generates control signals of the arm 4 for moving the tool T along a taught track, according to the control program. The generated control signals of the arm 4 are output to the driving parts of the arm 4 through the arm control part 17. Consequently, the arm 4 moves so that the tool T advances in a direction taught by the control program in a state where the copying guide 8 is in contact with the copying mold J1. Thereby, the outline copying of the workpiece W by the rotating tool T is started.

When the tool T advances to come into contact with the workpiece W, a processing reaction force is applied on the tool T from the workpiece W. In addition, a reaction force corresponding to a pressing force from the copying guide 8 is also applied on the copying guide 8 from the copying mold J1. The reaction forces applied on the tool T and the copying guide 8 are transmitted to the arm 4. As a result, a force is applied on the arm 4 from the tool T and the copying guide 8.

The components of the force applied on the arm 4 from the tool T during the outline copying are detected by the force sensors 9 attached to the arm 4. The components of the force detected by the force sensors 9 are output to the control system 3 of the robot 2. Then, the load acquisition part 13 obtains detection values of the components of the force, output from the force sensors 9, and gives them to the control signal generation part 14.

Subsequently, the control signal generation part 14 detects a force in the feed direction F of the tool T, a force in the tool diameter direction D perpendicular to the feed direction F of the tool T and a force in the tool axis AX direction respectively, based on the obtained detection values of the components of the force output from the force sensors 9. Then, the control signal generation part 14 automatically controls the arm 4 based on the force in the feed direction F of the tool T, the force in the tool diameter direction D perpendicular to the feed direction F of the tool T and the force in the tool axis AX direction.

That is, the control signal generation part 14 generates control signals of the arm 4 for the outline copying, based on not only the control program of the arm 4 for the outline copying but the forces obtained from the load acquisition part 13. The generated control signals of the arm 4 are output to the drive parts of the arm 4 through the arm control part 17. Thereby, the outline copying is carried out with a force control of the arm 4.

Specifically, the moving speed of the arm 4 and the tool T is automatically adjusted based on the force in the feed direction F of the tool T. For example, a feedback control of the moving speed of the arm 4 and the tool T is carried out so that the reaction force in the feed direction F of the tool T may be constant or within a predetermined range. Alternatively, when the reaction force in the feed direction F of the tool T is excessive, the feed speed of the tool T is decreased so as to be slower than a teaching speed of the tool T designated as a parameter in the control program of the arm 4.

Thereby, an excessive reaction force applied on the tool T can be avoided and degradation in processing quality caused by vibration of the tool T can be prevented. On the contrary, working efficiency can be improved by avoiding an excessive speed reduction of the tool T.

Furthermore, positions of the arm 4 and the tool T are automatically adjusted based on the force in the tool diameter direction D perpendicular to the feed direction F of the tool T and the force in the tool axis AX direction. Specifically, the positions of the arm 4 and the tool T are finely adjusted so that each of the force in the tool diameter direction D perpendicular to the feed direction F of the tool T and the force in the tool axis AX direction may be constant or within a predetermined range. Thereby, a proper pressing force can always be applied on the copying mold J1 from the copying guide 8 during the outline copying. As a result, the workpiece W having more accurate sizes can be machined. For example, the workpiece W can be machined with processing accuracy in which a tolerance is about ±0.1 mm to ±1.0 mm.

When the outline copying with the force control of the arm 4 has been completed, a product or a semi-product can be produced as the machined workpiece W.

(Effects)

As described above, the machining robot 1, as an example of a machining apparatus, and the machining method perform outline copying of the workpiece W by bringing the copying guide 8 attached to the arm 4 side of the robot 2 into contact with the copying mold J1 placed on the workpiece W, while controlling movement of the arm 4 based on processing reaction forces detected by the force sensors 9. Specifically, a movement speed of the tool T and the arm 4 is controlled so that the reaction force in the feed direction F of the tool T may not become excessive while the arm 4 is controlled so that each of the reaction force in the tool diameter direction D perpendicular to the feed direction F of the tool T and the reaction force in the tool axis AX direction may become constant or within a predetermined range. Moreover, the control system 3 and the control method of the robot 2 can control the arm 4 of the robot 2 for the above-mentioned outline copying.

Therefore, the machining robot 1 and the machining method can perform heavy cutting working, such as outline trim processing, outline rough processing, outline finish processing, groove processing, pocket processing and drilling, of the workpiece W, with a large reaction force from the workpiece W, with high accuracy in spite of using the robot 2. As a result, machining of the workpiece W can be automated without placing a large scale machine tool.

Specifically, even the tool T attached to the arm 4 of the robot 2 having low positioning accuracy compared with a machine tool can be positioned with high accuracy by copying while making the copying guide 8 attached to the arm 4 side of the robot 2 in contact with the copying mold J1 place on the workpiece W. Consequently, even the workpiece W requiring processing accuracy whose tolerance is about ±0.1 mm to ±1.0 mm can be finished by machining within the tolerance. In particular, placing the copying mold J1 on the workpiece W allows not only linear machining but curved machining. Therefore, a desired shape can be formed by cutting working, such as outline trim processing, of the workpiece W.

In addition, the copying guide 8 can always be brought into contact with the copying mold J1, with proper pressing forces in both the tool diameter direction D and the tool axis AX direction each perpendicular to the feed direction F of the tool T, by controlling the arm 4 so that each of the reaction forces in the tool diameter direction D and the tool axis AX direction may become constant or within a predetermined range. Therefore, even heavy machining, such as outline trim processing, with a large processing reaction force can be performed using the arm 4 of the robot 2 of which rigidity is low compared with rigidity of a spindle of a machine tool. That is, outline copying, such as outline trim processing, can be performed using the arm 4 of the robot 2 although it has been conventionally considered that a robot arm having low rigidity cannot perform the outline copying generating a large reaction force.

Furthermore, vibration of the tool T held by the arm 4 of the robot 2 having low rigidity compared with rigidity of a spindle of a machine tool can be suppressed since the moving speed of the tool T and the arm 4 is automatically adjusted so that the reaction force in the feed direction F of the tool T may not become excessive. As a result, machining quality similar to that obtained by a machine tool can be obtained using the robot 2 extremely inexpensive compared with a machine tool.

Moreover, the moving speed of the tool T and the arm 4 can be automatically adjusted appropriately so as to follow the reaction forces from the workpiece W even when the plate thickness of the workpiece W is not constant and/or the reaction forces from the workpiece W do not become constant because of wear of the tool T or the like. Thereby, improvement in machining efficiency by avoiding an excessive slow down of the tool T and prevention of a failure accompanied with movement of the tool T at an excessive speed can be made compatible.

(Second Implementation)

Figure 7:
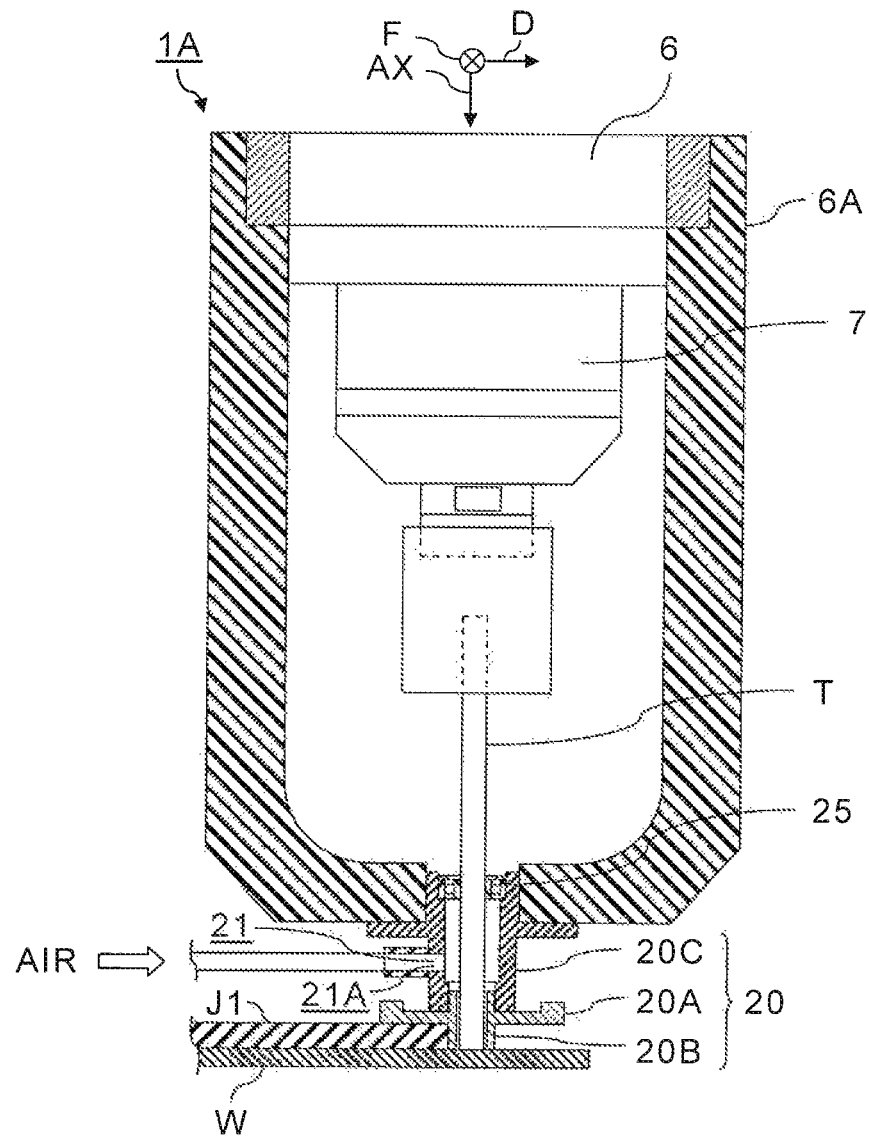
FIG. 7 is a sectional view showing a detailed example of structure of a copying guide attached to a machining robot as an example of machining apparatus according to the second implementation of the present invention.
Figure 7:
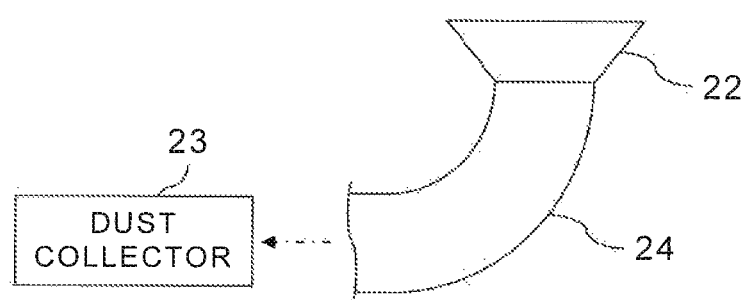

FIG. 7 is a sectional view showing a detailed example of structure of a copying guide attached to a machining robot as an example of machining apparatus according to the second implementation of the present invention.

The machining robot 1A in the second implementation shown in FIG. 7 is different from the machining robot 1 in the first implementation in the point that a copying guide 20 for being contacted with the copying mold J1 placed in the workpiece W side has a function to prevent scattering of cut chips and an air cooling function. Since other configurations and actions of the machining robot 1A in the second implementation are not substantially different from the machining robot 1 in the first implementation, a structure of the copying guide 20 is mainly illustrated together with the feed structure 6 and the spindle 7 to be attached to the arm 4 as exemplified in FIG. 1, and explanations for the same or corresponding elements will be omitted with attaching the same signs.

Also in the second implementation, the copying guide 20 in the machining robot 1A side is also attached to the feed structure 6, which gives the tool T a feed in the tool axis direction AX, and the spindle 7, which holds and rotates the tool T. Also in an example shown in FIG. 7, the copying guide 20 has been fixed to the casing 6A of the feed structure 6, similarly to an example shown in FIG. 1.

Figure 8:
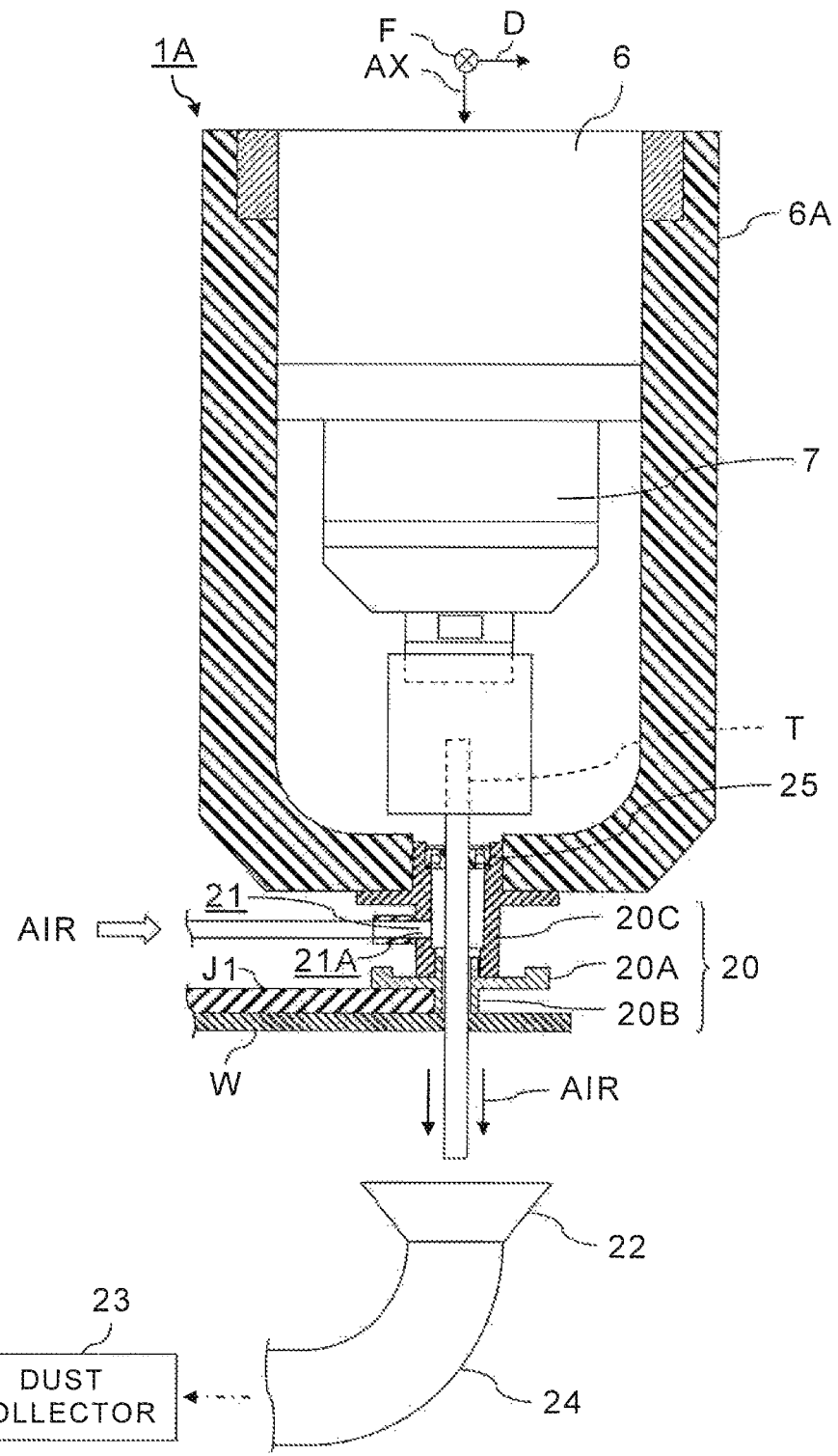
FIG. 8 shows a state where the tool and the spindle have been fed out in the tool axis direction by the feed structure shown in FIG. 7.

FIG. 8 shows a state where the tool T and the spindle 7 have been fed out in the tool axis AX direction by the feed structure 6 shown in FIG. 7.

The copying guide 20 in the second implementation also has a disk member 20A and the first cylindrical part 20B along the same axis, and has a through hole for passing the tool T through along the center line, similarly to the copying guide 8 in the first implementation. The disk member 20A functions as a guide for positioning the tool T in the tool axis direction AX of the tool T by contacting with the copying mold J1 in the tool axis direction AX as shown in FIG. 8. Meanwhile, the first cylindrical part 20B functions as a guide for positioning the tool T in the tool diameter direction D of the tool T by contacting with the copying mold J1 in the tool diameter direction D as shown in FIG. 8.

In addition, the copying guide 20 in the second implementation has an air supply passage 21 for supplying air injected toward the workpiece W side through a clearance between the tool T and the through hole for passing the tool T through. For that purpose, the copying guide 20 in the second implementation is provided with the second cylindrical part 20C for forming the air supply passage 21 in the spindle 7 side of the disk member 20A, for example.

Then, an air supply port 21A for forming the air supply passage 21 can be formed on the second cylindrical part 20C. The air supply port 21A is a through hole which opens the through hole, for passing the tool T through, toward the outside, at the second cylindrical part 20C. Therefore, air can be supplied from the air supply port 21A into the through hole for passing the tool T through. Then, a flow of the air can be formed so that the air flows from the copying guide 20 toward the workpiece W side through the air supply port 21A and the subsequent clearance between the tool T and the through hole for passing the tool T through.

The air supply port 21A can be formed by a coupler or the like for coupling the second cylindrical part 20C to a compressed air supply tank with an air supplying hose, as shown in FIG. 8. Then, the air supply port 21A can be connected to the compressed air supply tank with a hose.

When air is blew off from the clearance between the tool T and the copying guide 20 towards the workpiece W side, chips, such as powder dust of a composite material or metal chips, generated by cutting can be blown away in the air ejection direction. Thereby, the chips can be prevented from not only dispersing around but dispersing to enter the clearance between the tool T and the copying guide 20.

In addition, the tool T can also be cooled by the air since the air flows along with the tool T. Thereby, the wear of the tool T and the degradation in machining quality due to temperature rise of the tool T are avoidable.

A pan 22 for collecting chips blown away by the air ejected toward the workpiece W side can be placed at a blowout destination of the air. In an illustrated example, the pan 22 has been disposed under the workpiece W so that the pan 22 may not interfere with the tool T.

A dust suction duct 24 can be coupled to the pan 22 in order to suck the chips, collected by the pan 22, by a dust collector 23. Thereby, not only scattering of the chips to the surrounding area due to rotation of the tool T can be prevented, but also the chips can be collected by the dust collector 23. In particular, when the workpiece W is made of CFRP, the scattering of carbon dust can be prevented effectively by the suction force of the dust collector 23 while the carbon dust can be collected.

When the copying guide 20 has the air supply port 21A and the second cylindrical part 20C for forming the air supply port 21A, the length of the copying guide 20 in the tool axis AX direction becomes long. Therefore, the through hole for passing the tool T through also becomes long. Accordingly, it is necessary for machining workpiece W to secure the length of the tool T so that the tool T may project by a sufficient length from the copying guide 20. For example, in a case of trimming or side surface finishing of the workpiece W, it is necessary to use the tool T which has such a length as a whole that the length of the projecting part of the tool T from the copying guide 20 may be longer than the thickness or the length of the workpiece W in the tool axis AX direction.

However, the longer the length of the tool T is, the more rigidity deteriorates and the higher the possibility that wobbling arises becomes. Thus, a bearing 25 can be attached for reducing the wobbling of the tool T held by the spindle 7. The bearing 25 for stopping the wobbling can be disposed inside the through hole, for passing the tool T through, of the copying guide 20, for example. Thereby, the necessity of the further increase in the tool length in order to dispose the bearing 25 can be avoided. In other words, the interference of the spindle 7 with the bearing 25 is avoidable.

When the bearing 25 is used for preventing the tool T from wobbling, it is appropriate to determine the inner diameter of the inner ring composing the bearing 25 so that the fit tolerance between the inner diameter of the inner ring and the diameter of the tool T corresponds to a clearance fit.

The clearance fit is a fit by which a clearance is formed constantly when a shaft is combined with a hole. In other words, the clearance fit is a fit by which the minimum size of a hole is larger than the maximum size of a shaft. As a specific example, when it is assumed that a tolerance of the tool T corresponding to a shaft is h7 or h8 under Japanese industrial Standards, a tolerance of the inner diameter of the inner ring composing the bearing 25 should be set to be a tolerance corresponding to F7 or F8 under Japanese Industrial Standards in order to fit the tool T with the inner ring by a clearance fit.

Instead of forming the air supply port 21A on the copying guide 20, the air supply passage 21 for taking in air may be formed in another part, such as the casing 6A of the feed structure 6. Nevertheless, a structure that the bearing 25 is disposed inside the through hole of the copying guide 20 while the air supply port 21A is formed at a position, in the workpiece W side of the bearing 25, on the copying guide 20 allows leading a sufficient amount of air to the workpiece W side since the clearance between the bearing 25 and the tool T is small.

The above-mentioned copying guide 20 having the air supply passage 21 can be provided as an attachment for the robot 2 including the arm 4, having a cantilever structure, to which the spindle 7 and the feed structure 6 have been attached. Alternatively, the machining apparatus itself composed of the spindle 7 and the feed structure 6 of the tool T to which the air supply passage 21 and the copying guide 20 have been formed and attached respectively may be provided as an attachment for the robot 2 including the arm 4 having a cantilever structure.

When the air supply passage 21 and the copying guide 20 are used for outline copying, the air supply passage 21 and the copying guide 20 are attached to the spindle 7 and the feed structure 6 attached to the arm 4 of the robot 2. Alternatively, the spindle 7 and the feed structure 6 having the air supply passage 21 and the copying guide 20 are attached to the arm 4 of the robot 2. Meanwhile, the copying mold J1 is placed in the workpiece W side. Then, the outline copying of the workpiece W is performed using the tool T by moving the arm 4 of the robot 2 while making the copying guide 20 contact with the copying mold J1. That is, a product or a partially-processed product can be produced by the outline copying of the workpiece W.

In addition, air can be supplied in the copying guide 20 through the air supply passage 21 during the outline copying. As a specific example, in a case where the air supply port 21A formed on the copying guide 20 forms the air supply passage 21 as exemplified in FIG. 7 and FIG. 8, air can be supplied inside the copying guide 20 from the air supply port 21A, and the supplied air can be injected towards the workpiece W through the clearance between the copying guide 20 and the tool T. Thereby, chips generated by the outline copying can be prevented from scattering while the tool T can be cooled by the air.

As a matter of course, a force applied on the arm 4 from at least the tool T during the outline copying may be detected by the force sensors 9 and the moving speed of the arm 4 may be automatically adjusted based on the forces detected by the force sensors 9, also in the second implementation, similarly to the first implementation. In addition, it is possible to perform cutting work, such as drilling of the workpiece W, accompanied with moving the tool T in the tool axis AX direction, using the copying guide 20 in the second implementation, similarly to the first implementation.

The above-mentioned machining robot 1A and machining method in the second implementation can prevent chips from scattering and air-cool the tool T, by blowing off air from the clearance between the tool T and the copying guide 20 for copying.

Therefore, the machining robot 1A and the machining method in the second implementation can achieve effects that chips can be prevented from scattering and the tool T can be air-cooled, in addition to effects similar to the effects achieved by the machining robot 1 and the machining method in the first implementation. As a result, a situation that chips clog the copying guide 20 for copying or chips scatter around the workpiece W can be avoided while wear of the tool T and degradation in machining quality due to a temperature rise of the tool T can be avoided.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

For example, a tool which is not a rotating type may be attached to the arm 4 of the robot 2 for machining the workpiece W although a case where the rotating tool T is attached to the arm 4 of the robot 2, with the spindle 7, for machining the workpiece W has been explained in the first implementation mentioned above. As a concrete example, the workpiece W may be cut off by attaching a saw, such as a band saw or a wire saw, to the arm 4 of the robot 2. Also in such a case, copying can be performed by attaching a copying guide to the arm 4 and placing a copying mold in the workpiece W side. In addition, the arm 4 can be automatically controlled based on reaction forces from the workpiece W and the copying mold, measured by the force sensors 9.

On the other hand, although a case where the copying guide 20 and the air supply passage 21, consisting of the air supply port 21A or the like, are attached to the machining robot 1A has been described in the second implementation, an attachment having the copying guide 20 and the air supply passage 21 may be used to be attached to another machining apparatus. As a concrete example, an attachment having the copying guide 20 and the air supply passage 21 may be attached to a machining apparatus including a handheld drill driving device, an automatic drilling machine and a machining tool, such as a drill press or a milling machine.

As a matter of course, an attachment having the copying guide 20 and the air supply passage 21 may be attached to a machining apparatus, such as a hand router, having no feed structure of a tool but having a spindle of a tool. That is, an attachment having the copying guide 20 and the air supply passage 21 can be attached to a machining apparatus having at least a spindle of a tool. More specifically, an attachment having the copying guide 20 and the air supply passage 21 can be attached to a part, such as a casing, which does not rotate, of a spindle of a machining apparatus.

What is claimed is:

1. An attachment fora machining apparatus, comprising:
a copying guide on a machining apparatus side, the copying guide having a cylindrical part forming a first through hole for passing a tool through, the copying guide being contacted with a copying mold placed on a workpiece side, the copying guide being attached to a spindle holding and rotating the tool; and an air supply passage adapted to supply air ejected toward the workpiece side through a clearance between the tool and the first through hole, wherein the clearance between the tool and the first through hole is arranged such that chips generated by the tool are blown away in a direction of air injection through the clearance while the tool is engaged with a workpiece, wherein the chips are blown away to a side of the workpiece that is opposite to the workpiece side, and wherein the copying guide further comprises a second through hole that opens toward an outside of the copying guide and defines a portion of the air supply passage that is configured for coupling with an air supply hose.

2. The attachment for the machining apparatus according to claim 1:

wherein a pan collects chips blown away by the air ejected toward the workpiece side; and wherein a dust suction duct sucks the chips, collected by the pan, by a dust collector.

3. The attachment for the machining apparatus according to claim 1, further comprising:

a bearing for reducing wobbling of the tool held by the spindle.

4. The attachment for the machining apparatus according to claim 3, wherein the bearing is disposed inside the first through hole.

5. A machining apparatus comprising:
the attachment according to claim 1; and
the spindle,
wherein the attachment is attached to the spindle.

6. The machining apparatus according to claim 5, further comprising:

a robot having an arm to which the spindle is attached, the arm having a cantilever structure; and a control system of the robot.

7. The attachment for the machining apparatus according to claim 2, further comprising:

a bearing for reducing wobbling of the tool held by the spindle.

8. The attachment for the machining apparatus according to claim 7, wherein the bearing is disposed inside the first through hole.

9. The attachment for the machining apparatus according to claim 2, wherein the copying guide includes:

a first guide for positioning the tool in a tool diameter direction of the tool, the first guide contacting with the copying mold in the tool diameter direction; and a second guide for positioning the tool in a tool axis direction of the tool, the second guide contacting with the copying mold in the tool axis direction.

10. The attachment for the machining apparatus according to claim 3, wherein the copying guide includes:

a first guide for positioning the tool in a tool diameter direction of the tool, the first guide contacting with the copying mold in the tool diameter direction; and a second guide for positioning the tool in a tool axis direction of the tool, the second guide contacting with the copying mold in the tool axis direction.

11. The attachment for the machining apparatus according to claim 4, wherein the copying guide includes:

a first guide for positioning the tool in a tool diameter direction of the tool, the first guide contacting with the copying mold in the tool diameter direction; and a second guide for positioning the tool in a tool axis direction of the tool, the second guide contacting with the copying mold in the tool axis direction.

12. A machining apparatus comprising:
the attachment according to claim 2; and
the spindle,
wherein the attachment is attached to the spindle.

13. A machining apparatus comprising:
the attachment according to claim 3; and
the spindle,
wherein the attachment is attached to the spindle.

14. A machining apparatus comprising:
the attachment according to claim 4; and
the spindle,
wherein the attachment is attached to the spindle.

15. A machining apparatus comprising:
the attachment according to claim 7; and
the spindle,
wherein the attachment is attached to the spindle.

16. A machining apparatus, comprising:
the attachment according to claim 1;
a pan for collecting chips blown away by the air ejected toward the workpiece side;
a dust suction duct for sucking the chips collected by the pan; and
a dust collector in communication with the dust suction duct to receive the chips collected by the pan.

17. The machining apparatus according to claim 5, further comprising a casing that receives the spindle and attaches to the copying guide such that the casing, the spindle, and the copying guide are axially adjustable together.

18. A machining method comprising:
attaching the attachment according to claim 1 to the spindle of the machining apparatus;
placing the copying mold on the workpiece side; and
producing a product or a semi-product by outline copying of the workpiece using the tool, the outline copying being performed while the copying guide contacts the copying mold.

19. The machining method according to claim 18,
wherein the spindle to which the attachment has been attached is attached to an arm of a robot and the outline copying is performed by moving the arm, the arm having a cantilever structure.

20. The machining method according to claim 19,
wherein a force applied on the arm from at least the tool during the outline copying is detected by a force sensor and a moving speed of the arm is adjusted automatically based on the force detected by the force sensor.

21. An attachment fora machining apparatus, comprising:
a copying guide on a machining apparatus side, the copying guide having a first through hole for passing a tool through, the copying guide being contacted with a copying mold placed on a workpiece side, the copying guide being attached to a spindle holding and rotating the tool; and an air supply passage adapted to supply air ejected toward the workpiece side through a clearance between the tool and the first through hole, wherein the copying guide includes:

a first guide for positioning the tool in a tool diameter direction of the tool, the first guide contacting with the copying mold in the tool diameter direction; and a second guide for positioning the tool in a tool axis direction of the tool, the second guide contacting with the copying mold in the tool axis direction, wherein the first guide has a cylindrical portion that receives the tool therethrough and has a distal free end, wherein the first through hole is formed in the cylindrical portion, wherein the second guide comprises a disk portion that extends radially out from an exterior of the cylindrical portion, with the disk portion having a distal side for contact with the copying mold and a diameter greater than an external diameter of the cylindrical portion at a level along a diameter of the tool defined by a proximal side of the disk portion, wherein the clearance between the tool and the first through hole is arranged such that chips generated by the tool are blown away in a direction of air injection through the clearance while the tool is engaged with a workpiece, wherein the chips are blown away to a side of the workpiece that is opposite to the workpiece side, and wherein the copying guide further comprises a second through hole that opens toward an outside of the copying guide and defines a portion of the air supply passage that is configured for coupling with an air supply hose.

22. A machining apparatus comprising:
the attachment according to claim 21; and
the spindle,
wherein the attachment is attached to the spindle.

23. A machining apparatus comprising:
the attachment according to claim 21; and
a casing that receives the spindle and attaches to the copying guide such that the casing, the spindle, and the copying guide are axially adjustable together.

24. A machining apparatus, comprising:
a robot having a robot arm with a cantilever structure and a control system;
a spindle supported by the robot arm;
a tool driven by the spindle;
a copying guide having a through hole for passing the tool through, the copying guide being contacted with a copying mold placed on a workpiece side, the copying guide being supported directly or indirectly by the robot arm;
an air supply passage adapted to supply air ejected toward the workpiece side through a clearance between the tool and the through hole,
wherein the copying guide includes:
   a first guide for positioning the tool in a tool diameter direction of the tool, the first guide contacting with the copying mold in the tool diameter direction, and
   a second guide for positioning the tool in a tool axis direction of the tool, the second guide contacting with the copying mold in the tool axis direction; and
a first force sensor that is in communication with the control system and is positioned for detecting a radial reaction force applied on the robot arm.

25. The machining apparatus of claim 24 wherein the first force sensor is mounted between a distal end of the robot arm and a proximal end of the spindle.

* * * * *